(12) United States Patent
Zhang et al.

(10) Patent No.: US 9,369,555 B2
(45) Date of Patent: Jun. 14, 2016

(54) ANGLE ADJUSTABLE STAND MECHANISM

(71) Applicant: Wistron Corporation, New Taipei (TW)

(72) Inventors: Xiao-Feng Zhang, New Taipei (TW);
Cheng-Hsuan Lin, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 33 days.

(21) Appl. No.: 14/195,780

(22) Filed: Mar. 3, 2014

(65) Prior Publication Data

US 2014/0306074 A1 Oct. 16, 2014

(30) Foreign Application Priority Data

Apr. 12, 2013 (CN) .......................... 2013 1 0127573

(51) Int. Cl.
| | | |
|---|---|---|
| *H04M 1/12* | (2006.01) | |
| *F16M 11/04* | (2006.01) | |
| *F16M 11/10* | (2006.01) | |
| *F16M 11/40* | (2006.01) | |
| *F16M 13/00* | (2006.01) | |
| *H04M 1/04* | (2006.01) | |

(52) U.S. Cl.
CPC .............. *H04M 1/12* (2013.01); *F16M 11/041* (2013.01); *F16M 11/10* (2013.01); *F16M 11/40* (2013.01); *F16M 13/005* (2013.01); *H04M 1/04* (2013.01)

(58) Field of Classification Search
USPC ............. 379/428.04, 454; 248/686, 688, 558, 248/188.8, 351
See application file for complete search history.

(56) References Cited

U.S. PATENT DOCUMENTS

| | | | |
|---|---|---|---|
| 4,819,266 A * | 4/1989 | Awakowicz et al. | 379/454 |
| 5,087,004 A * | 2/1992 | Lundell et al. | 248/126 |
| 5,432,836 A * | 7/1995 | Jarrett | 379/435 |
| 6,263,548 B1 | 7/2001 | Ikeda | |
| 6,386,502 B1 * | 5/2002 | Yamagishi | 248/685 |
| 6,445,793 B1 * | 9/2002 | Vassallo et al. | 379/428.01 |
| 7,130,421 B2 * | 10/2006 | Xue | 379/435 |

(Continued)

FOREIGN PATENT DOCUMENTS

| | | |
|---|---|---|
| CN | 1252246 | 5/2000 |
| CN | 201069870 | 6/2008 |

OTHER PUBLICATIONS

Office Action issued to Chinese Counterpart Application No. 201310127573.6 by the State Intellectual Property Office of the P.R.C. on Sep. 1, 2015, along with an English translation of sections boxed in red (14 pages).

(Continued)

*Primary Examiner* — Bradley Duckworth
(74) *Attorney, Agent, or Firm* — DLA Piper LLP (US)

(57) ABSTRACT

A stand mechanism includes a shell for connection with an electronic device and having an outer surface and a bottom end connected to the outer surface, and a supporting leg including a connecting end surface, a supporting end portion opposite to the connecting end surface, and opposite first and second surfaces extending between the connecting end surface and the supporting end portion. A fixing unit interconnects the shell and the supporting leg. The supporting leg is selectively secured to the shell at a first or second position, where the first or second surface faces the bottom end. The outer surface is inclined with respect to the flat surface at a first or second angle when the supporting leg is at the first or second position.

11 Claims, 8 Drawing Sheets

(56) References Cited

U.S. PATENT DOCUMENTS

| | | | |
|---|---|---|---|
| 7,986,777 B2* | 7/2011 | Daly et al. | 379/454 |
| 8,011,636 B2* | 9/2011 | Fukuda et al. | 248/685 |
| 8,360,382 B2* | 1/2013 | Wu et al. | 248/371 |
| 8,750,495 B2* | 6/2014 | Suzuki et al. | 379/435 |
| 2002/0088918 A1* | 7/2002 | Uto et al. | 248/688 |
| 2008/0029664 A1* | 2/2008 | Hsu | 248/188.8 |
| 2010/0051775 A1 | 3/2010 | Wu et al. | |
| 2012/0120628 A1* | 5/2012 | Bliven et al. | 361/807 |

OTHER PUBLICATIONS

Office Action issued to Taiwanese Counterpart Application No. 102113635 by the Taiwan Intellectual Property Office on Sep. 25, 2015 along with an English translation of sections boxed in red (14 pages).

* cited by examiner

ANGLE ADJUSTABLE STAND MECHANISM

CROSS-REFERENCE TO RELATED APPLICATION

This application claims priority of Chinese Patent Application No. 201310127573.6, filed on Apr. 12, 2013, the disclosure of which is incorporated herein by reference.

BACKGROUND OF THE INVENTION

1. Field of the Invention

The present invention relates to a stand mechanism, and more particularly to a stand mechanism with an adjustable supporting angle.

2. Description of the Related Art

In recent years, because the number of users of electronic communication devices is increasing, in order to attract the attention of the users, manufacturers often equip the electronic device with various accessories, so that the electronic device can provide a better use experience to the users.

Among the accessories of the electronic device is a stand mechanism. The stand mechanism is used to support the electronic device on a flat surface at an inclined angle, so that an operation panel or a display screen of the electronic device may face a user, thereby achieving the effect of improved comfort and convenient operation thereof. However, when the electronic device is used in different use environments, the stand mechanism cannot provide the best use effect of the electronic device at the same inclined angle because it is placed on a surface with different heights or in different lighting conditions.

Figure 1:
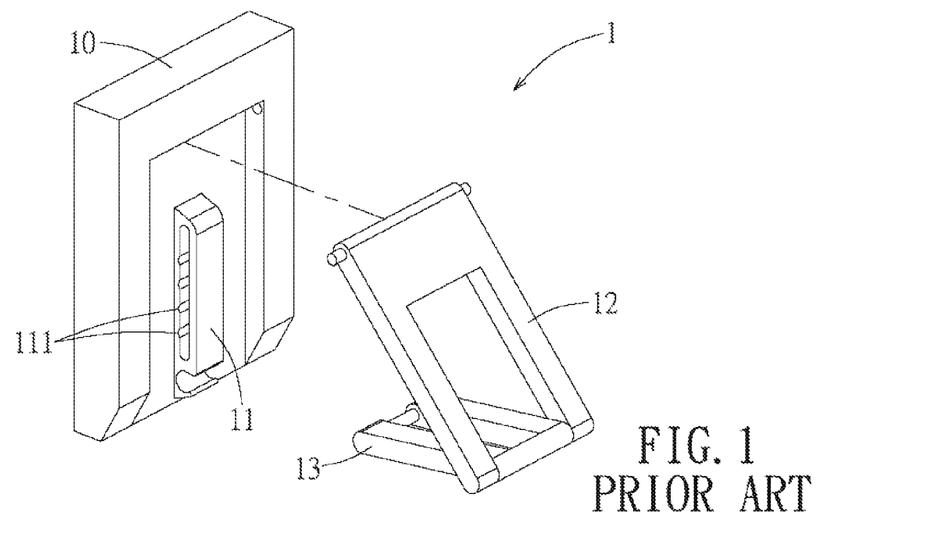
FIG. 1 is an exploded perspective view of an existing stand mechanism.
Figure 2:
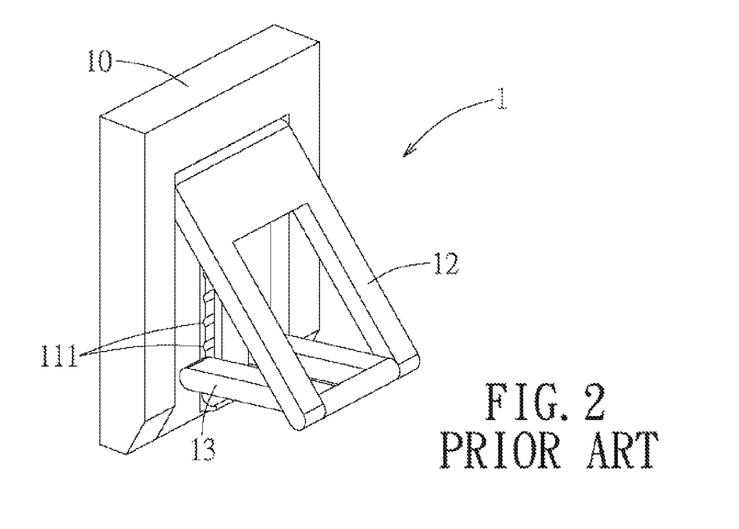
FIG. 2 is an assembled perspective view of FIG. 1.
Figure 3:
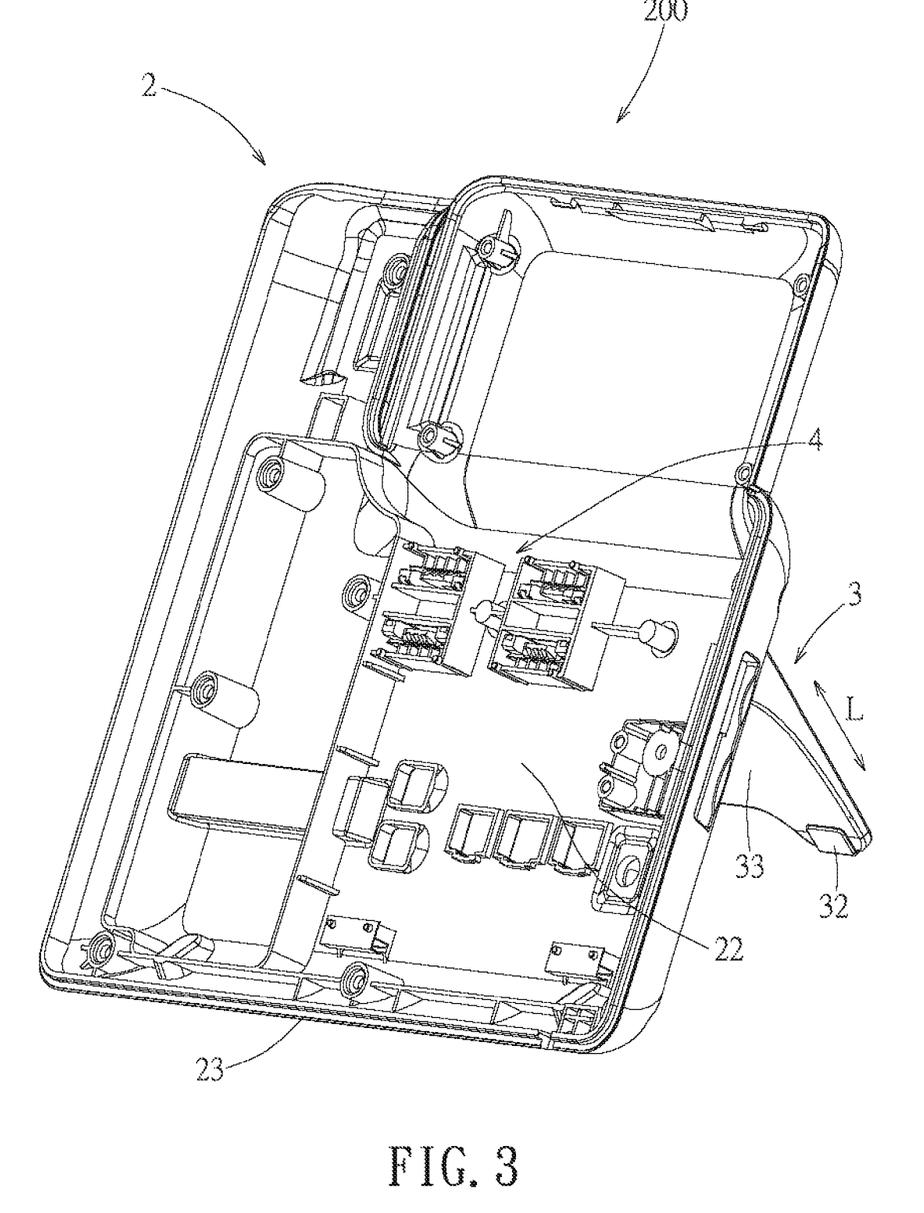
FIG. 3 is a perspective view of an embodiment of a stand mechanism according to the present invention.
Figure 4:
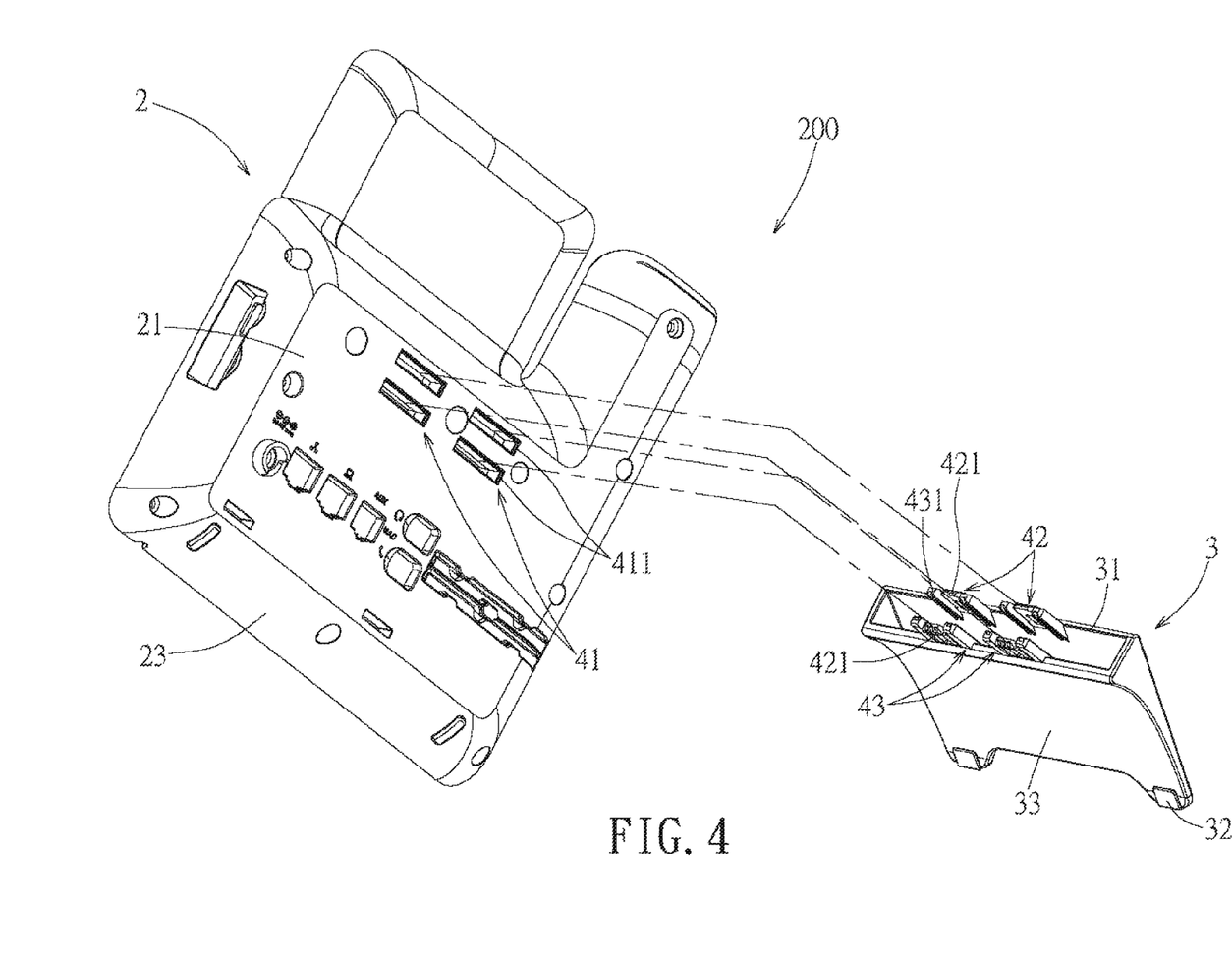
FIG. 4 is an exploded perspective view of a shell and a supporting leg of the embodiment.
Figure 5:
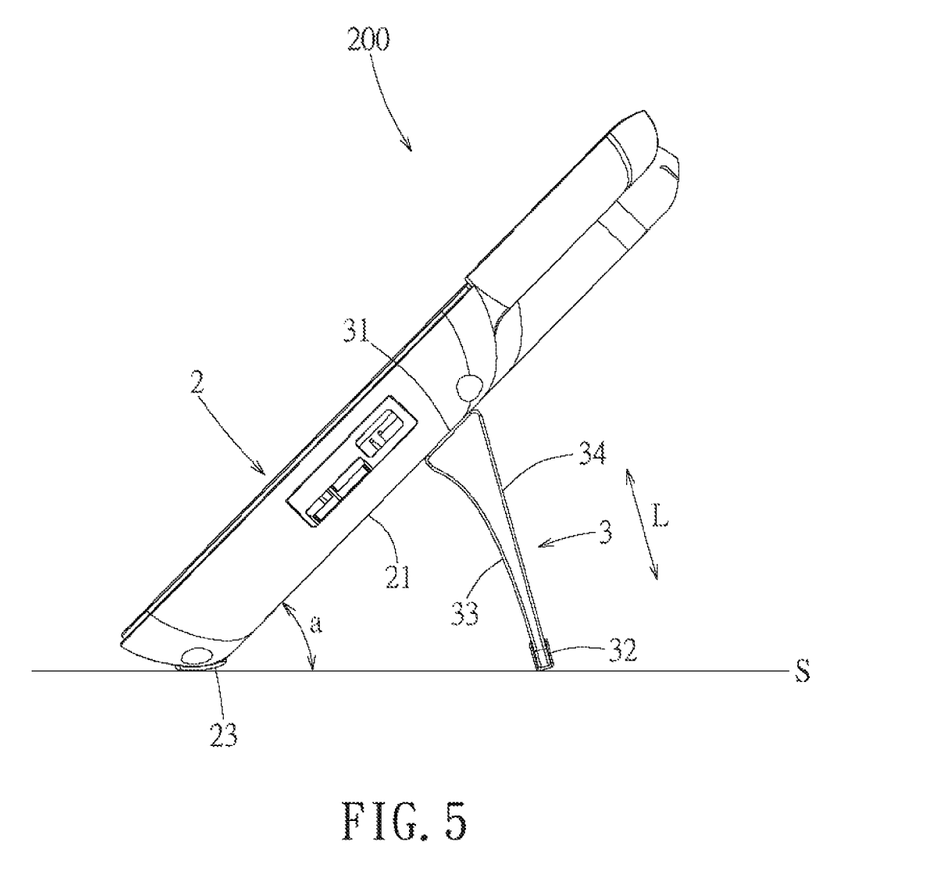
FIG. 5 is a schematic side view of the embodiment, illustrating a supporting leg at a first position.
Figure 6:
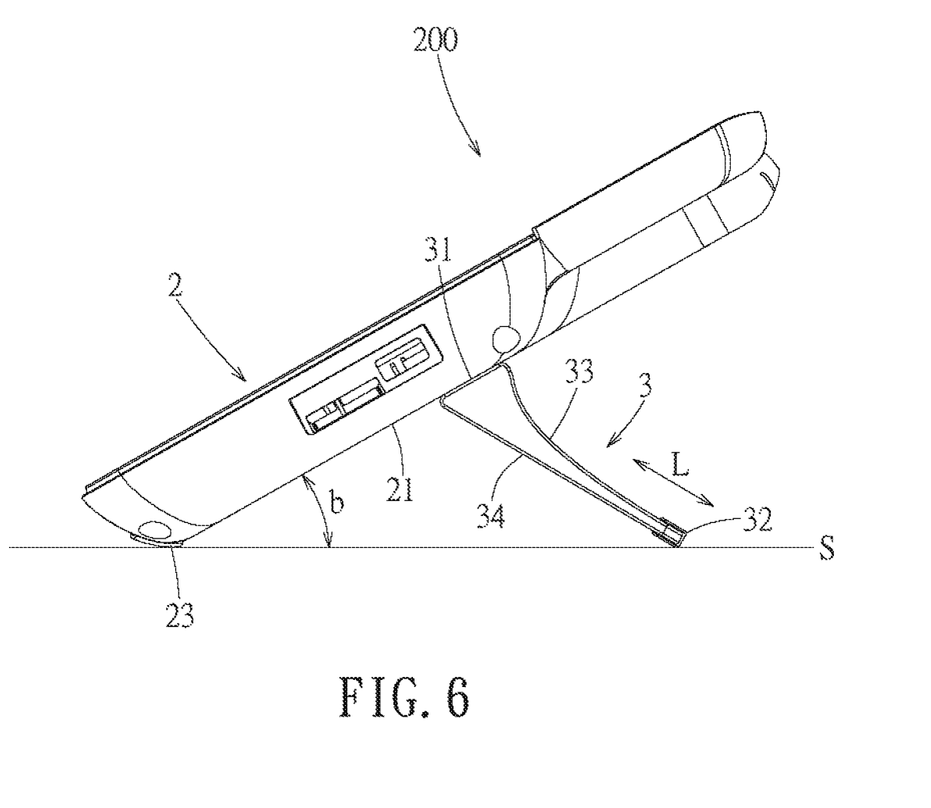
FIG. 6 is a view similar to FIG. 5, but illustrating the supporting leg at a second position.
Figure 7:
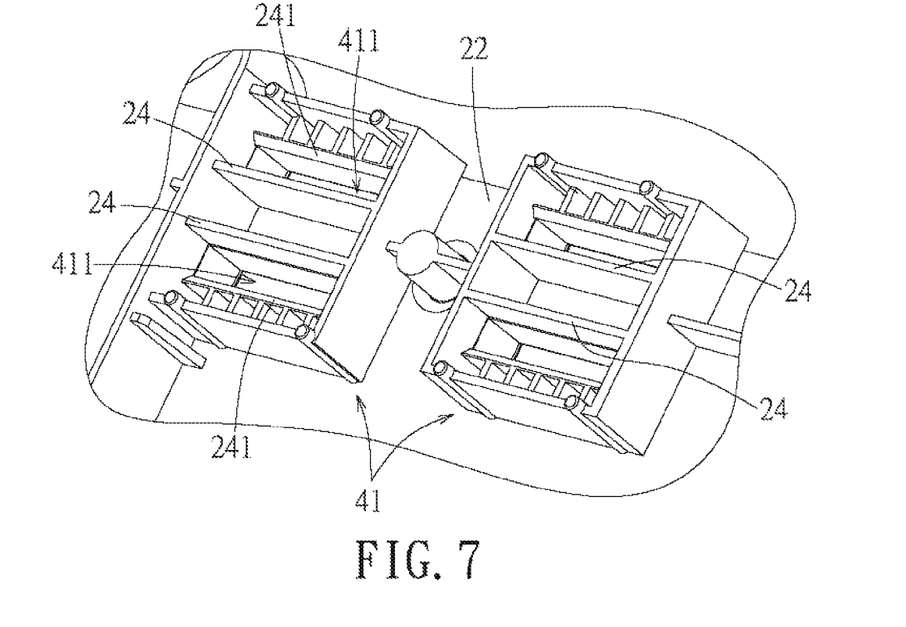
FIG. 7 is an enlarged perspective view of a first fixing structure of the embodiment.
Figure 8:
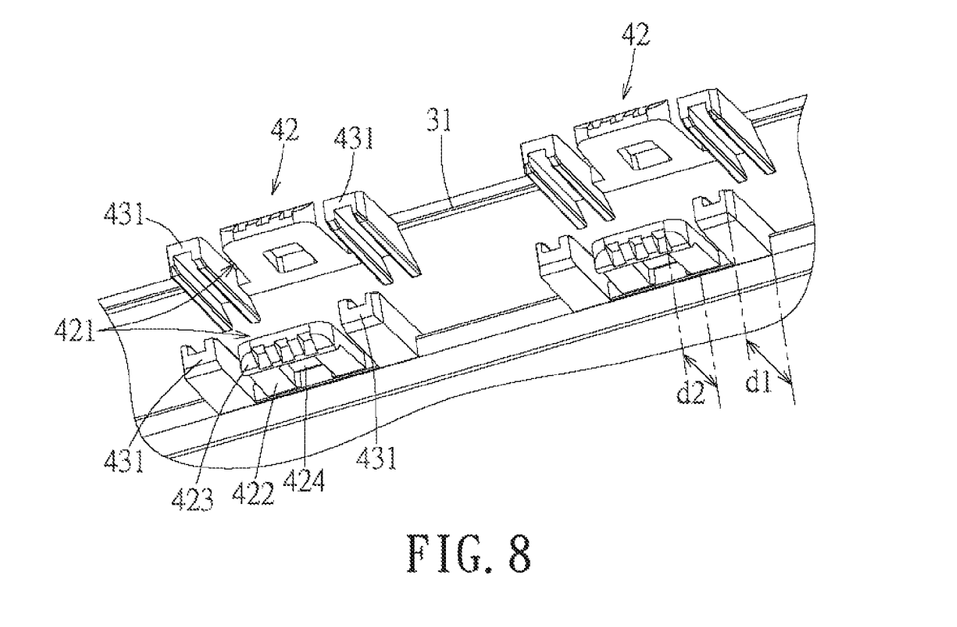
FIG. 8 is an enlarged perspective view of a second fixing structure and a guide structure of the embodiment.
Figure 9:
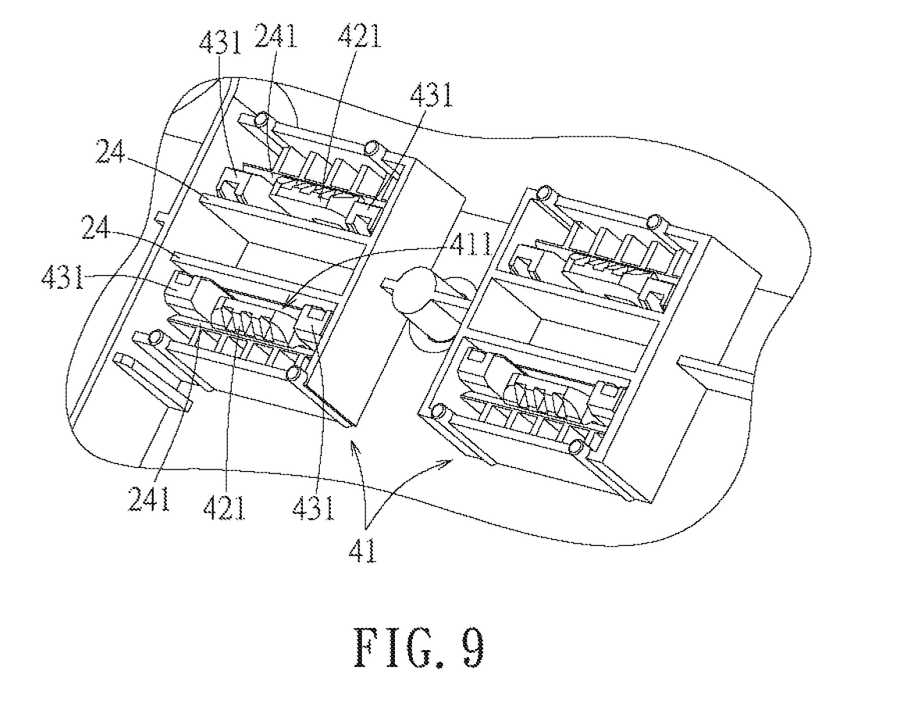
FIG. 9 illustrates how the second fixing structure and the guide structure are connected to the first fixing structure.
Figure 10:
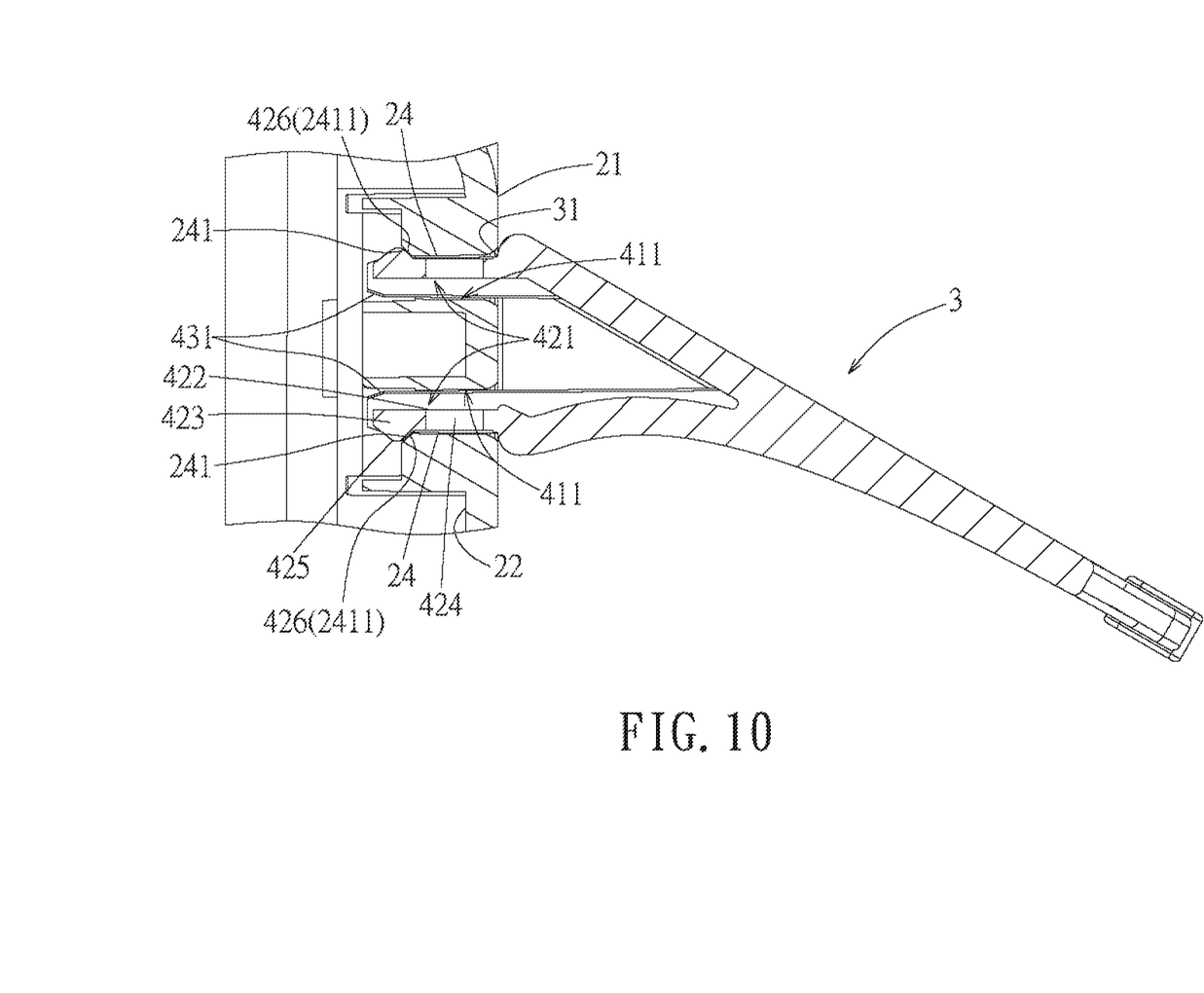
FIG. 10 is a fragmentary sectional view of the embodiment, illustrating how retaining hooks are respectively engaged to retaining grooves.

Therefore, some manufacturers have developed a stand mechanism with an adjustable supporting angle so as to adjust an inclined angle of an electronic device with respect to different use environments. FIGS. 1 and 2 illustrate an existing stand mechanism 1 with an adjustable supporting angle. The stand mechanists 1 includes a limiting portion 11 secured to an electronic device 10, a first support frame 12 pivotally connected to the electronic device 10 and extending outwardly, and a second support frame 13. The limiting portion 11 has a plurality of positioning structures 111 at different positions. The second support frame 13 has one end pivotally connected to the first support frame 12, and the other end selectively secured to one of the positioning structures 111. Because the second support frame 13 can be selectively secured to one of the positioning structures 111, an angle of the first support frame 12 with respect to the electronic device 10 can also be changed, thereby adjusting an inclined angle of the electronic device 10.

However, the existing stand mechanism 1 is composed of many elements, such as the first support frame 12, the second support frame 13, and the plurality of the positioning structures 111. Further, the first support frame 12 must be pivotally connected to the second support frame 13 and the electronic device 10. Hence, the structure of the stand mechanism 1 is complicated, resulting in a high manufacturing cost and a complicated manufacturing process. The complex movable structure, after being used for a long period of time, is likely to cause damage to the stand mechanism 1. Thus, there is room for improving the existing stand mechanism 1 with an adjustable supporting angle.

SUMMARY OF THE INVENTION

Therefore, an object of the present invention is to provide a stand mechanism having a simple structure and an adjustable supporting angle.

A stand mechanism according to the present invention for supporting an electronic device on a flat surface comprises a shell, a supporting leg, and a fixing unit. The shell is used for connection with the electronic device, is generally plate-shaped, and includes an outer surface and a bottom end connected to the outer surface.

The supporting leg extends along a length direction and includes a connecting end surface, a supporting end portion opposite to the connecting end surface, and a first surface extending between the connecting end surface and the supporting end portion at one ends thereof, and a second surface extending between the connecting end surface and the supporting end portion opposite to the first surface. The length direction is not perpendicular to the connecting end surface.

The fixing unit includes at least a first fixing structure provided on the shell, and a second fixing structure provided on the connecting end surface and corresponding in quantity to the first fixing structure. The first and second fixing structures are detachably secured to each other.

The connecting end surface of the supporting leg abuts against the outer surface of the shell. The shell is supported by the supporting leg on the flat surface. The supporting leg is selectively secured to the shell at a first position, where the first surface faces the bottom end, or a second position, where the second surface faces the bottom end. The outer surface of the shell is inclined with respect to the flat surface at a first angle when the supporting leg is at the first position and a second angle when the supporting leg is at the second position. The supporting leg is operable to be pulled out, turned over, and then reconnected to the shell to change between the first and second positions.

The effect of the present invention resides in that, by using the simple-structured, one-piece supporting leg to detachably connect to the shell, a user may select to allow the supporting leg to combine with the shell and support the sense at the first position or the second position, so that the shell is adjustable between two different angles with respect to the flat surface, which simplifies the complex structure of the existing stand mechanism with an adjustable supporting angle, greatly reduces the manufacturing cost and time, and is less likely to cause damage to the stand mechanism.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

The above-mentioned and other technical contents, features, and effects of this invention will be clearly presented from the following detailed description of one embodiment in coordination with the reference drawings.

Referring to FIGS. 3 to 6, a stand mechanism 200 according to the present invention is adapted to support an electronic device (not shown) on a flat surface (S), and comprises a shell 2, a supporting leg 3, and a fixing unit 4. The electronic device may be, for example, a telephone. The shell 2 is integrally formed with and connected to a casing of the electronic device, is generally plate-shaped, and includes an outer surface 21, an inner surface 22 opposite to the outer surface 21, and a bottom end 23 connected to the outer surface 21 for abutment against the flat surface (S) in a substantially parallel manner.

The supporting leg 3 extends along a length direction (L), and includes a connecting end surface 31, a supporting end portion 32 opposite to the connecting end surface 31, a first surface 33 extending between the connecting end surface 31 and the supporting end portion 32 at one ends thereof, and a second surface 34 extending between the connecting end surface 31 and the supporting end portion 32 opposite to the first surface 33. The connecting end surface 31 is used to abut against the outer surface 21, and the supporting end portion 32 is used to abut against the flat surface (S). The length direction (L) is not perpendicular to the connecting end surface 31.

The fixing unit 4 includes two first fixing structures 41 that are provided on the shell 2 and that are spaced apart from each other in a direction parallel to the bottom end 23, and two second fixing structures 42 that are provided on the connecting end surface 31 and that are spaced apart from each other also in a direction parallel to the bottom end 23, and two guide structures 43 provided on the connecting end surface 31 in proximity to the respective second fixing structures 42. The first and second fixing structures 41, 42 are detachably secured to each other. The guide structures 43 are used to guide connection of the second fixing structures 42 and the first fixing structures 41.

By using the fixing unit 4 to interconnect the shell 2 and the supporting leg 3, the shell 2 can be supported by the supporting leg 3 on the flat surface (S). The connecting end surface 31 of the supporting leg 3 stably abuts against the outer surface 21 of the shell 2 at this time. The supporting leg 3 is selectively secured to the shell 2 at a first position (see FIG. 5), where the first surface 33 faces the bottom end 23, or a second position (see FIG. 6), where the second surface 34 faces the bottom end 23. When the supporting leg 3 is at the first position, the outer surface 21 is inclined with respect to the flat surface (S) at a first angle (a), and when the supporting leg 3 is at the second position, the outer surface 21 is inclined with respect to the flat surface (S) at a second angle (b). The supporting leg 3 is operable to be pulled out, turned over, and then reconnected to the shell 2 to change between the first and second positions. In other words, because the first and second fixing structures 41, 42 are detachably secured to each other, the supporting leg 3 and the shell 2 can be separated and reassembled so as to selectively dispose the supporting leg 3 at the first position or the second positron. Because an included angle between the length direction (L) and the outer surface 21 differs when the supporting leg 3 is at the first and second positions, when the shell 2 is supported by the supporting leg 3 on the flat surface (S), the outer surface 21 can be inclined with respect to the flat surface (S) at the first angle (a) or the second angle (b), thereby achieving the effect of adjusting an inclined angle of the shell 2 with respect to the flat surface (S).

In particular, referring to FIG. 4 and FIGS. 7 to 10, each of the first fixing structures 41 includes two retaining grooves 411 formed in the shell 2. The retaining grooves are parallel to and are spaced apart from each other in a direction perpendicular to the bottom end 23. Each of the second fixing structures 42 includes two spaced-apart retaining hooks 421 formed on the connecting end surface 31 and corresponding in position to the retaining grooves 411. The retaining hooks 421 are respectively inserted into the retaining grooves 411 so as to engage the same. Through this, the supporting leg 3 can he secured to the shell 2, and the connecting end surface 31 thereof can abut against the outer surface 21. Each of the guide structures 43 includes two spaced-apart pairs of guide posts 431. Each pair of the guide posts 431 is provided on two opposite sides of the respective retaining hook 421. The pairs of the guide posts 431 project from the connecting end surface 31 and extend into the respective retaining grooves 411. Each of the guide posts 431 has a length (d1) greater than a length (d2) of each retaining hook 421. Therefore, as the retaining hooks 421 approach the respective retaining grooves 411, the guide posts 431 will first extend into the respective retaining grooves 411 so as to achieve a guiding effect, thereby assisting the retaining hooks 421 to align with and smoothly engage the respective retaining grooves 411.

Each of the retaining hooks 421 includes a resilient portion 422 extending from the connecting end surface 31 toward the respective retaining groove 411, a hook portion 423 formed on the resilient portion 423 distal from the connecting end surface 31, and a through hole 424 formed through the resilient portion 422. The hook portions 423 of the retaining hooks 421 of each second fixing structure 42 face opposite each other. The hook portion 423 of each retaining hook 421 has an inclined surface 425 (see FIG. 10) that provides an additional guide mechanism when each retaining hoot 421 is inserted into the respective retaining groove 411, so that the supporting leg 3 can be easily assembled to the shell 2. In addition, with the provision of the resilient portion 422, the two retaining hooks 421 of each second fixing structure 42 can slightly move close to each other when extending into the respective retaining grooves 411, so that the hook portions 423 thereof can smoothly pass through the respective retaining grooves 411 and out of the inner surface 22 of the shell 2. The design of forming the through hole 424 in each resilient portion 422 has the effect of enhancing the resiliency of each resilient portion 422, so that even if the length of each resilient portion 422 is short, it still has a resiliency, and will not interfere with internal elements of the electronic device that are connected to the shell 2 due to excessive length.

The shell 2 further includes four groove-defining walls 24 extending inwardly from the inner surface 22 and respectively defining the retaining grooves 411. The hook portion 423 of each retaining hook 421 passes through the respective engaging groove 411 and engages a wall edge 241 of the respective groove-defining wall 24, so that each retaining hook 421 is stably retained in the respective retaining groove 411. It is worth mentioning that the hook portion 423 of each retaining hook 421 and the wall edge 241 of the respective groove-defining wall 42 have inclined surfaces 426, 2411 (see FIG. 10) that abut against each other and that are inclined at about 45 degrees with respect to the resilient portion 422 of the respective retaining hook 421. Therefore, when separating each retaining hook 421 from the respective retaining groove 411, the nook portion 423 of each retaining hoot 421 can smoothly enter and pass through the respective retaining groove 411 through the guidance of the inclined surfaces 426, 2411 of the hook portion 423 and the wall edge 241. Hence, the retaining hooks 421 can be directly pulled out and separated from the respective retaining grooves 411.

It should be noted that one pair of the guide posts 431 of each guide structure 43 may be assembled to the respective retaining groove 411 in a loose fitting manner. Since not all of the guide posts 431 are in a tight-fitting manner with the respective retaining grooves 411, excessive restraints on the guide structures 43 caused by manufacturing tolerances between the guide posts 431 and the respective retaining grooves 411 can be avoided, so that the assembly of the supporting leg 3 onto the shell 2 can be more easily facilitated. It is also worth mentioning that although the stand mechanism of this embodiment comprises two first fixing structures 41 and two second fixing structures 42 so that connection between the shell 2 and the supporting leg 3 is more stable, in actual practice, the number of each of the first and second fixing structures 41, 42 may be varied according to the requirements of a user. For example, one, three, or more than three first fixing structures 41 and second fixing structures 42 may be provided, as long as the supporting leg 3 and the shell 2 may be secured to each other.

In this embodiment, the electronic device is exemplified as a telephone (not shown), and the flat surface (S) is exemplified as a tabletop. When the supporting leg 3 is at the first position, the outer surface 21 is inclined with respect to the flat surface (S) at the first angle (a) of 45 degrees. When the supporting leg 3 is at the second position, the outer surface 21 is inclined with respect to the flat surface (S) at the second angle (b) of 30 degrees. The above-mentioned angle design can allow a user to conveniently view and press keys on the telephone when the telephone is supported on the tabletop [the flat surface (S)]. Further, the connecting end surface 31 of the supporting leg 3 is connected to a central portion (see FIG. 5) of the outer surface 21, so that the telephone will not turn over when the keys are pressed. The user may selectively place the outer surface 21 to incline with respect to the flat surface (S) at the first angle (a) or the second angle (b) according to his/her personal preference or use habits. Indeed, it is easy to understand that the stand mechanism according to the present invention may be used on any other electronic devices, and is not limited to the telephone of this embodiment.

To sum up, through the detachable connection of the supporting leg 3 with the shell 2, the present invention can allow a user to selectively connect the supporting leg 3 to the shell 2 at the first position or the second position so as to support the same at the first angle (a) or the second angle (b), so that the shell 2 is adjustable between the two different angles (a, b) with respect to the flat surface (S). Further, because the supporting leg 3 is a simple one-piece mechanical structure, the cost and time for manufacturing the stand mechanism of the present invention can be greatly reduced, and damage to the stand mechanism is less likely to occur in use. Moreover, through the abutting relationship of the inclined surfaces 426, 2411 of the hook portion 423 of each retaining hook 421 and the wall edge 241 of the respective groove-defining wall 42, the retaining hooks 421 can be easily separated from the shell 2 by directly pulling out the retaining hooks 421 from the respective retaining grooves 411. Thus, the supporting leg 3 can be quickly assembled to and disassembled form the shell 2, and adjustment time can be saved. Additionally, because the two retaining grooves 411 of each first fixing structure 41 are spaced apart from each other in a direction perpendicular to the bottom end 23 and are arranged symmetrically, the connecting end surface 31 of the supporting leg 3 is connected to the outer surface 21 at the same position whether the supporting leg 3 is at the first position or the second position, so that an area to be provided by the outer surface 21 for abutment of the connecting end surface 31 can be minimized.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A stand mechanism for supporting an electronic device on a flat surface, comprising:
   a shell for connection with the electronic device, said shell including an outer surface that is substantially flat, and a bottom end connected to said outer surface;
   a supporting leg extending along a length direction and including a connecting end surface, a supporting end portion opposite to said connecting end surface, a first surface extending from one end of said connecting end surface to a corresponding end of said supporting end portion, and a second surface extending between said connecting end surface and said supporting end portion opposite to said first surface, said length direction being not perpendicular to said connecting end surface; and
   a fixing unit including at least one first fixing structure provided on said shell, and a second fixing structure provided on said connecting end surface and corresponding in quantity to said first fixing structure, said first and second fixing structures being detachably secured to each other; wherein said connecting end surface of said supporting leg abuts against said outer surface of said shell, said shell being supported by said supporting leg on the flat surface, said supporting leg being selectively secured to said shell at a first position, where said first surface faces said bottom end, or a second position, where said second surface faces said bottom end, said outer surface of said shell being inclined with respect to the flat surface at a first angle when said supporting leg is at said first position and a second angle when said supporting leg is at said second position;
   wherein said supporting leg is operable to be pulled out, turned over, and then reconnected to said shell to change between said first and second positions;
   wherein said fixing unit further includes at least one guide structure provided on said connecting end surface in proximity to said second fixing structure, said guide structure being used to guide connection of said second fixing structure and said first fixing structure;
   wherein said first fixing structure includes two retaining grooves formed in said shell, said retaining grooves being parallel to and spaced apart from each other in a direction perpendicular to said bottom end, said second fixing structure including two spaced-apart retaining hooks formed on said connecting end surface and corresponding in position to and respectively engaging said retaining grooves; and
   wherein said guide structure includes two spaced-apart pairs of guide posts, each pair of said guide posts being provided on two opposite sides of a respective one of said retaining hooks, each of said guide posts projecting from said connecting end surface and extending into a corresponding one of said retaining grooves.

2. The stand mechanism of claim 1, wherein each of said retaining hooks includes a resilient portion extending from said connecting end surface toward a respective one of said retaining grooves, and a hook portion formed on said resilient portion distal from said connecting end surface.

3. The stand mechanism of claim 2, wherein said shell further includes an inner surface opposite to said outer surface, and two groove-defining walls extending inwardly from said inner surface and respectively defining said retaining grooves, said hook portion of each of said retaining hooks passing through the respective one of said retaining grooves and engaging a wall edge of a respective one of said groove-defining walls, said hook portion of each of said retaining hooks and said wall edge of said respective groove-defining wall having inclined surfaces that abut against each other.

4. The stand mechanism of claim 2, wherein said resilient portion of each of said retaining hooks has a through hole formed therethrough.

5. The stand mechanism of claim 1, wherein a length of each of said guide posts is greater than a length of each of said retaining hooks.

6. The stand mechanism of claim 1, wherein said fixing unit includes two said first fixing structures spaced apart from each other in a direction parallel to said bottom end, and two said second fixing structures spaced apart from each other in a direction parallel to said bottom end, one pair of said guide posts being inserted into a respective one of said retaining grooves with a clearance therebetween.

7. The stand mechanism of claim 1, wherein said outer surface is inclined with respect to the flat surface at a first angle of 45 degrees when said supporting leg is at said first position, and is inclined with respect to the flat surface at a second angle of 30 degrees when said supporting leg is at said second position.

8. The stand mechanism of claim 1, wherein said fixing unit includes two said first fixing structures spaced apart from each other in a direction parallel to said bottom end, and two said second fixing structures spaced apart from each other in a direction parallel to said bottom end.

9. The stand mechanism of claim 1, wherein said shell is adapted to be integrally formed as one piece with a casing of the electronic device.

10. The stand mechanism of claim 1, wherein said shell is integrally formed with and connected to a casing of the electronic device, and the electronic device is a telephone.

11. The stand mechanism of claim 1, wherein said connecting end surface of said supporting leg is connected to said outer surface of said shell at the same position whether said supporting leg is at the first position or the second position.

* * * * *